United States Patent
Gasparotti

(10) Patent No.: US 8,685,918 B1
(45) Date of Patent: Apr. 1, 2014

(54) WEIGHT LOSS REGIMEN COMPRISING ENTERAL AND ORAL FEEDING SEGMENTS EFFECTIVE FOR THE TREATMENT OF OBESITY

(76) Inventor: Marco Gasparotti, Rome (IT)

( * ) Notice: Subject to any disclaimer, the term of this patent is extended or adjusted under 35 U.S.C. 154(b) by 249 days.

(21) Appl. No.: 12/985,094

(22) Filed: Jan. 5, 2011

(51) Int. Cl.
*A61K 38/00* (2006.01)

(52) U.S. Cl.
USPC .......................................... 514/4.8; 514/1.1

(58) Field of Classification Search
None
See application file for complete search history.

(56) References Cited

U.S. PATENT DOCUMENTS

| | | |
|---|---|---|
| 3,155,097 A | 11/1964 | Barron |
| 4,410,320 A | 10/1983 | Dykstra et al. |
| 4,416,267 A | 11/1983 | Garren et al. |
| 4,547,192 A | 10/1985 | Brodsky et al. |
| 4,610,673 A | 9/1986 | Russo |
| 4,704,111 A | 11/1987 | Moss |
| 4,874,365 A | 10/1989 | Frederick et al. |
| D308,576 S | 6/1990 | Iversen |
| 5,290,250 A | 3/1994 | Bommarito |
| 5,503,629 A | 4/1996 | Catone et al. |
| 6,268,011 B1 * | 7/2001 | Hoie .............................. 426/634 |
| 6,464,686 B1 | 10/2002 | O'Hara et al. |
| 6,675,809 B2 | 1/2004 | Stack et al. |
| 6,994,095 B2 | 2/2006 | Burnett |
| 7,112,186 B2 | 9/2006 | Shah |
| 7,470,251 B2 | 12/2008 | Shah |
| 2006/0020278 A1 | 1/2006 | Burnett et al. |

OTHER PUBLICATIONS

Dickerson, R. N., et al. Nutrition (2002), 18(3); pp. 241-246.*
Kumpf, V. J. et al. Nutr. Clin. Pract. (2007), 22(6); pp. 673-678; Medline listing provided.*
Roux-en-y gastric bypass edition St. John's Hospital, pp. 36-39; Available at least by Aug. 18, 2009.*
Post-Op Diet (http://www.angelfire.com/ok5/postopdiet/; Available at least by Jan. 31, 2001).*

* cited by examiner

*Primary Examiner* — Kevin S Orwig
(74) *Attorney, Agent, or Firm* — Malloy & Malloy, P.L.

(57) ABSTRACT

A method of losing weight which is effective for, but not limited to, the treatment of obesity in an individual includes administering nutrients high in protein by a combination of enteral feeding and oral feeding over a predetermined time period. The predetermined time period is preferably defined by three consecutive time segments, wherein the conducting of the enteral feeding occurs during the first time segment, preferably by nasogastric intubation and the infusion of a high protein solution. Subsequently and consecutively the oral feeding proceeds over a second time segment and a third time segment, where the nutrients in the second time segment are a combination of a drinkable solution and solid food and the nutrients administered during the third time segment comprise a balanced, low-calorie diet.

22 Claims, 2 Drawing Sheets

WEIGHT LOSS REGIMEN COMPRISING ENTERAL AND ORAL FEEDING SEGMENTS EFFECTIVE FOR THE TREATMENT OF OBESITY

BACKGROUND OF THE INVENTION

1. Field of the Invention

This invention is directed to a method of losing weight which is rapid, safe, easy to use and implement, and effective for the treatment of an individual suffering from obesity. Predetermined nutrients high in protein are administered through a combination of enteral feeding and oral feeding over a predetermined time period. wherein the enteral feeding proceeds throughout a first time segment of the predetermined time period and is discontinued concurrently to the administering of nutrients by oral feeding during a predetermined second and third time segments of the predetermined time period.

2. Description of the Related Art

Individuals which are overweight and more importantly those classified as being obese are present in the United States and many other countries throughout the world. More specifically, extreme obesity is considered a major illness resulting in severe medical complications such as, but not limited to, hypertension, diabetes, coronary artery disease, stroke, congestive heart failure, etc.

The reasons for the overweight conditions in individuals are numerous and appear to be increasing in certain classes of individuals. More specifically, sedentary behavior of individuals of various ages frequently results in aggressive weight gain. Perhaps more importantly, children, due to poor dietary conditions and an apparent decrease in outdoor activity are also recognized as an increasing class of individuals approaching obesity. Additional factors resulting in weight gain and the overall increase in weight throughout different societies include the wide spread availability of processed, high-fat, high-carbohydrate food.

The most apparent and convenient, but less effective, approaches of weight loss and treating obesity include voluntary dieting methods. However, such dieting procedures have often been found to be unsuccessful for most individuals primarily due to a lack of sufficient will power to effectively eliminate the intake of food. Other more drastic techniques involve surgical and other medical procedures. More specifically, gastric reduction surgery has become a relatively common method of treatment for morbid obesity and includes, but is not limited to, "stomach stapling". Stomach stapling involves closing off a predetermined portion of the stomach in an effort to produce the feeling of fullness. Also, vertical banding involves the stomach be stapled in a predetermined manner. Subsequently a band may then be stapled or otherwise applied to the walls of the stomach to prevent the stomach from stretching and to control the size of the stomach outlet.

In addition to the above, inflatable bags have been used, wherein such bags are dimensioned to be swallowed into the stomach, where they are periodically inflated. Inflation occurs during time periods when food intake is desired or commonly practiced. Subsequent, to the intake of at least some nutrients the bag or balloon is then deflated for a period of time to simulate the feeling or procedure of digestion.

Other techniques used to reduce extreme weight loss include stomach fillers such as methylcellulose often taken in the form of tablets which provide a feeling of fullness to an individual with a hopeful result of decrease caloric intake.

However, numerous techniques, particularly those associated with medical and/or surgical procedures, are associated with significant risks that impact the desire to use such techniques and possibly the well being of the individual or patient being treated. The side effects associated with such medical or surgical procedures may include death, stroke, chronic diarrhea, nausea, vomiting, etc. When such side effects occur a second surgical procedure is sometimes required in order to alleviate these conditions.

Accordingly, there is a need in the area of weight loss treatment for a method or procedure which is capable of effectively treating excessive weight including, but not limited to, obesity or morbid obesity, which does not involve invasive surgery, is simple to implement and for a patient to use and follow, and can be quickly implemented. Such a preferred and proposed weight loss method accomplishes appropriate weight loss in the form of the elimination or reduction of fatty deposits of the individual being treated. Concurrently, muscle mass of the individual should remain in place. As a result, such a preferred and proposed method or system can be applied over a relatively short predetermined time period, preferably divided into a plurality of time segments, wherein each time segment involves a specific feeding procedure.

Therefore, a preferred and proposed weight loss method would preferably involve the combination of both enteral and oral feeding of high protein nutrients, as well as the performance of other dietary restrictions. The result would be the development of an individual's metabolism, which would accomplish rapid and effective weight loss without a prevalence of harmful side effects.

SUMMARY OF THE INVENTION

The present invention is directed to a method of losing weight which is effective for, but not limited to, the treatment of obesity. In addition a benefit of the subject weight loss method includes the possible and significant reduction of cellulite, through the elimination of fat deposits as will be made apparent hereinafter.

At least one preferred embodiment of the present invention comprises the administering of nutrients which are high in protein, utilizing a combination of procedures including enteral feeding and oral feeding, over a predetermined time period. More specifically, the enteral feeding procedure is conducted over a first time segment of the predetermined time period and includes the administration of nutrients preferably in the form of a high protein solution. Immediately thereafter, the oral feeding is accomplished over an immediately subsequent second time segment of the predetermined time period and includes the administering of nutrients comprising a combination of a drinkable solution and solid food. The oral feeding continues throughout a third time segment, which immediately follows the oral feeding associated with the second time period, and differs therefrom by the formulating of the nutrients to be orally fed during the third time period as including a balanced low-calorie diet.

As set forth above, the formulation of the nutrients submitted through the enteral feeding and oral feeding procedures is high in protein. In addition the nutrients submitted by enteral feeding during the first time segment is devoid of sugar. As a result the protein nutrition, absent sugar, will cause the body of the individual or patient being treated to draw all necessary energies from the consumption of the individual's fat tissue deposits. Accordingly, the continuous enteral feeding of the high protein solution maintains a stable level of keytones, thereby allowing the organs of the individual's body to keep a constant degree of insulin in the blood level. Therefore, at least one distinguishing feature of the weight loss method of the present invention involves the establishment of a stable level of keytones and the constant level of insulin in the blood of the individual. Such features are not achievable in known protein based weight loss methods that involve the intake of nutrients exclusively by oral feeding.

More specifically, the weight loss method of the present invention establishes a metabolism of the individual being treated which produces an excess of keytones in the blood level. Even more specifically, the supplementation of protein to the patient on a substantially continuous basis provides a stable increase of ketogenic bodies, which is not obtainable by the patient being orally administered nutrients, such as three times a day or other regular schedule. Moreover, the operative positioning and maintenance of a small nasogastric tube in the pharynix, during the enteral feeding time segment of the present invention, serves to restrict the oral intake of food or nutrients not prescribed by the present invention, due to a difficulty in swallowing. This has the added benefit of allowing the patient to verify the effectiveness of the weight loss method of the present invention, which is typically not possible when the patient is practicing an oral feeding conventional diet.

This excess keytone production serves to inhibit any sense of hunger in the individual, as well as concurrently generating a sense of well-being. Moreover, these effects allow an individual to more easily tolerate the duration of the applied procedures for a predetermined period. As set forth herein, such a predetermined time period is more specifically defined by a first time segment of the predetermined time period, wherein nutrition will be exclusively administered by enteral feeding, preferably using nasogastric intubation. The applied diet during this first time segment is restricted in terms of dietary and nutritional intake except for the consumption of predetermined liquids such as water, tea, herbal tea, coffee, all of which must be devoid of sugar. As a result, during the enteral feeding during the first time segment, the individual can rapidly lose weight in the form of body fat, in a percentage that varies from generally about 7% to 10% of the initial amount of body weight of the individual prior to treatment. Importantly, body lean mass or muscle mass does not decrease.

During the administrating of nutrients by oral feeding, conducted immediately subsequent to the first time segment and during a second time segment and third time segment of the predetermined time period, the individual will continue to lose weight generally in the order of about 2% to 3% of the body weight. In addition, the nutrients supplied by oral feeding may further educate or prompt the patient to follow a normal or regular health food regimen.

Preliminary procedures involved with the weight loss method of the present invention includes a physical examination in order to determine that the applied procedures are not contra-indicated to the state of health of the individual and/or medical treatment, procedures, etc. which the individual is or may have been involved. More specifically, the patient is examined by a physician who provides an overall state of health examination including the performance of clinical tests. Such tests, may include, but not limited to, complete blood count, blood urea nitrogen, uric acid, creatine, electrolytes, transaminases, ecg, etc. These tests and examination procedures serve to verify that there are no contraindications to the utilization and treatment of the weight loss method of the present invention, as set forth above. Such contraindications may involve, but are not necessarily limited to, cases of kidney failure, pregnancy and the use on patients under generally about 14 years of age. Other medical conditions involved with the individual that require medication will be evaluated on a case by case basis in order to plan a possible revision of drug doses taken by the patient.

In at least one preferred embodiment of the present invention the aforementioned predetermined time period, defined and/or categorized by the continuous procedure throughout three consecutive segments lasts generally about 24 days. Accordingly, the first time segment, during which the enteral feeding procedure is conducted, preferably generally lasts about 10 days. During this 10 day period the high protein solution is administered to the patient generally on a continuous basis such as generally throughout the majority of the 24-hour period of each day of the 10 day first time segment.

Subsequently, the oral feeding procedure is conducted wherein a drinkable solution and solid food is administered to the patient orally. The oral feeding, as generally as set forth above, takes place during consecutive second time segments and third time segments each preferably lasting generally about 7 days and concluding the aforementioned 24 day time period defining the predetermined time period during which the weight loss method of the present invention is conducted and completed. More specifically, during the second time segment lasting 7 days, nutrients are administered orally to the individual in the form of a drinkable solution prepared with protein and a solid food defined at least partially by a regular protein meal of either meat or fish or a combination thereof.

The oral feeding is maintained during the third time segment of the predetermined time period of 24 days. As such, the nutritional ingredients administered orally to the patient during the third time segment consist of a balanced but low-calorie food regimen wherein the calories are divided into predetermined food categories including carbohydrate, proteins and lipids.

The amount of protein included within the administered nutrients, whether by enteral feeding or oral feeding, is based upon the needs of each patient. Accordingly the protein content, as well as the amount of food to be administered everyday during the predetermined time period of preferably 24 days is calculated on the basis of anthropometric data of the patient or individual under treatment. Small changes may be included, according to particular physical activities or daily tasks conducted by the individual, such as type of work, amount of exercise, etc. Specifically, the weight of the patient is determined and multiplied by a factor of 1.2 for women and 1.5 for men. The resulting number will indicate the grams of protein to be administered, at least during the first time segment and in the form of the high protein solution, as set forth above.

In addition to the above the nutrients submitted during at least a portion of the 24 day, predetermined time period is highly acidic. Therefore, the drugs for stomach protection may be administered which include, but are not intended to be limited to, lansoprazole, ompeprazole, pantoprazole. In addition, every three days, or as needed the individual may be administered a laxative in order to maintain proper bodily functions. Minimal interruptions can be provided in order for the patient to perform daily or other routine toiletries, such as bathing, showering, etc.

Experimentation has resulted in the determination that within 24 to 48 hours during the first time segment and the conducting of enteral feeding, the individual has an increase in keytone bodies resulting in a metabolic state which benefits the patient, as set forth above. Such increase in keytone bodies is established by urinary tests preferably conducted daily by the individual in the home or other environment. Further, the amount of high protein solution to be daily administered by enteral feeding is sufficient to last for approximately each 24 hour period during which the enteral feeding is conducted on an at least a partially or substantially continuous basis, providing for the interruptions for bathing, etc. as set forth above.

The high protein solution includes a prescribed composition of high protein nutrients dissolved in two-liters of drinking water, as set forth in greater detail hereinafter. Accordingly, the unique contribution of proteins, more specifically, including the essential amino acids and a complete lack of carbohydrates activates the mechanism of lipolysis which leads to weight loss through the loss of body fat deposits and the maintenance of lean body mass from muscle. The maintenance and/or increase in keytone bodies are accomplished through a continuous infusion of proteins.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to a method of losing weight which is specifically, but not exclusively, effective for the treatment of individuals demonstrating an excessive weight including those classified as obese. As such, application and treatment utilizing the method of the present invention will result in a loss of fat deposits, as will be explained in greater detail hereinafter, a maintenance of the lean mass or muscle portions of an individual's body and the possible but recognizable loss of cellulite.

Accordingly, a preferred embodiment of the method of the present invention comprises the administering of predetermined nutrients, being high in protein, by a combination of procedures involving enteral feeding and oral feeding over a predetermined time period. In at least one preferred embodiment of the present invention, as schematically represented in FIG. 1, the predetermined time period preferably comprises 24 consecutive days and is divided into three different time segments.

More specifically, the conducting of the enteral feeding over a first time segment of the predetermined time period includes the administration of nutrients in the form of a high protein solution. As such the high protein solution is delivered substantially continuously over each 24-hour period defining the first time segment. The oral feeding of the individual or patient under treatment is conducted throughout a second time segment of the predetermined time period and includes the administration of nutrients comprising a combination of a drinkable solution and solid foods both of which are high in proteins. The oral feeding procedure is continued during and throughout a third time segment of the predetermined time period and includes the administration of nutrients in the form of a balanced, low-calorie diet.

Figure 1:
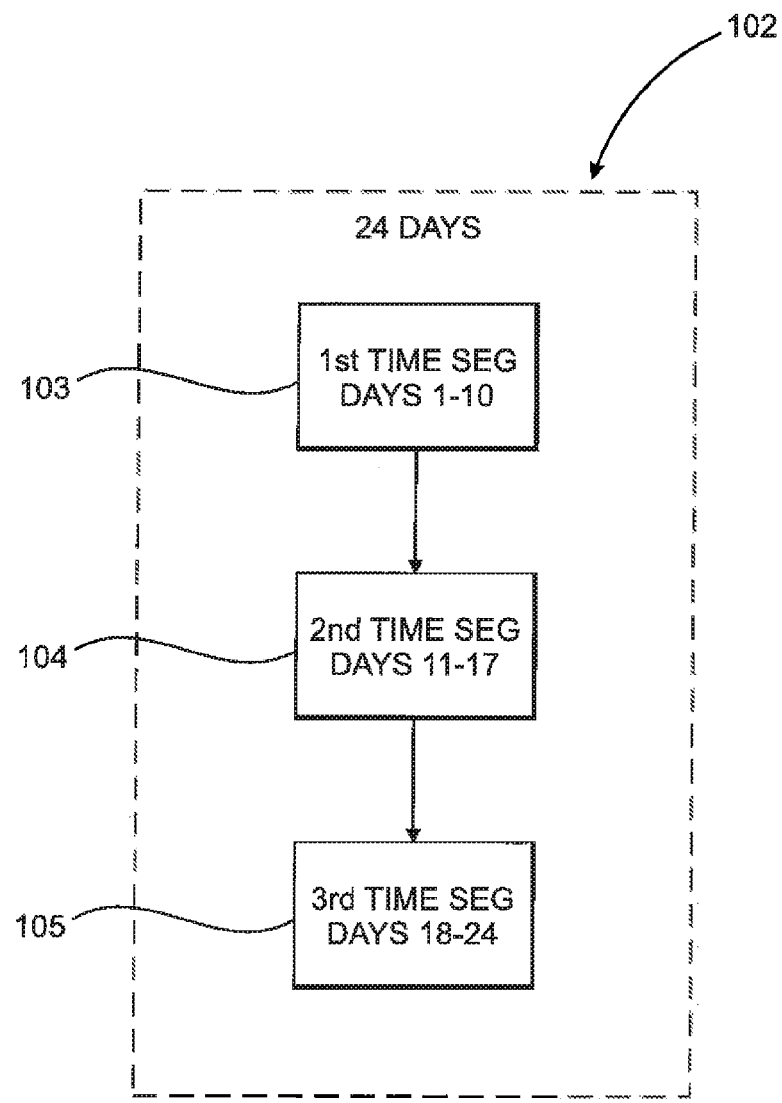
FIG. 1 is a schematic representation of a preferred, predetermined time period during which the weight loss method of the present invention is conducted during continuous and immediately consecutive first, second, third time segments.

As also emphasized with specific reference to FIG. 1, the performing of the administration of nutrients during the first, second and third time segments is accomplished in a consecutive, uninterrupted manner. As such, the first time segment during which enteral feeding is accomplished is generally about 10 days. Immediately thereafter the second time segment, during which the first bout of oral feeding is performed, is generally about 7 days. Similarly, the third time segment during which the continuing oral feeding is conducted also generally involves generally about 7 days. Therefore, the first, second and third time segments collectively extend throughout the 24 day predetermined time period.

In addition to the above, the diet or nutrient intake during the enteral feeding over the first time segment is restricted only to the aforementioned high protein solution and is devoid of the administration of any sugar. Also, predetermined liquids may be administered during this period, which also must be devoid of sugar and which may include, water, coffee, herbal tea, etc.

Additional features included and/or considered an operative part of the weight loss method of the present invention comprise the enteral feeding being conducted preferably by nasogastric intubation. As such a 2 mm nasogastric tube is applied to the individual patient being treated and through which the high protein liquid solution is administered. Significantly, such a 2 m tube is relatively small and easy to introduce into a patent unlike nose tubes utilized in other applications, such as during life support of a patient. Thus the introduction process is substantially rapid, safe and easy to implement quickly in a weight loss patient with minimal discomfort during everyday usage, especially in a preferred situation wherein a weight loss patient continues with their normal everyday routine while the tube stays introduced. Further, the administered of the high protein solution also includes essential amino acids, vitamins and mineral which are administered as a mixture with the high protein solution directly into the stomach of the individual. Structural and operative features which will facilitate enteral feeding may include conventional nasogastric intubation procedures and or structures including, but not limited to, a container for holding the premixed protein solution and the aforementioned nasogastric tube. Further, the positioning of the gastric tube may be done in an at least partially conventional manner and accomplished quickly and with little or no discomfort to the individual. More specifically, the individual may be disposed in a sitting or otherwise upright orientation and is invited to drink relatively small sips of cold water. Coordinated with the acts of swallowing, the medical personnel apply the feeding tube through the nose until it reaches the stomach cavity. The tube is then "blocked" or attached by tape to the face and/or high cheek bone area of the individual and behind the ear. The tube may be connected to the nutrient solution container and pass through the peristaltic pump that provides sufficient driving force to assure delivery of the solution to the stomach at a predetermined rate, which preferably, lasts generally over consecutive 24-hour periods defining the first time segment.

During the first time segment of 10 days of the predetermined time period of 24 days, the solution container may be carried on or with the individual utilizing shoulder bag, back pack, etc. so as to assure a substantially continuous delivery of the protein solution to the patient stomach in the intended manner. As set forth above, the gastro intubation may be discontinued and at least partially disposed in an inoperative orientation in order to facilitate bathing, showering, or other activities performed by the individual. Formulation of the high protein solution is initially in a powdered form but further formulated to be completely soluble in water. It is otherwise colorless and tasteless and may be categorized in the class of counter protein supplements with potassium and vitamins indicated in cases of reduced dietary intake or in situations where there is an increase in the demand in the nutrients provided. Preparation of the high protein solution formulation will be dependent upon the protein and/or nutrient demands of the individual. Such demands or needs may include a predetermined calculation or determination based on the weight of the patient multiplied by 1.2 for women and 1.5 for men. The resulting number will be indicative of the number of grams of protein to be administered within a give 24-hour period defining each of the 10 days of the first time segment, as set forth above.

Figure 2:
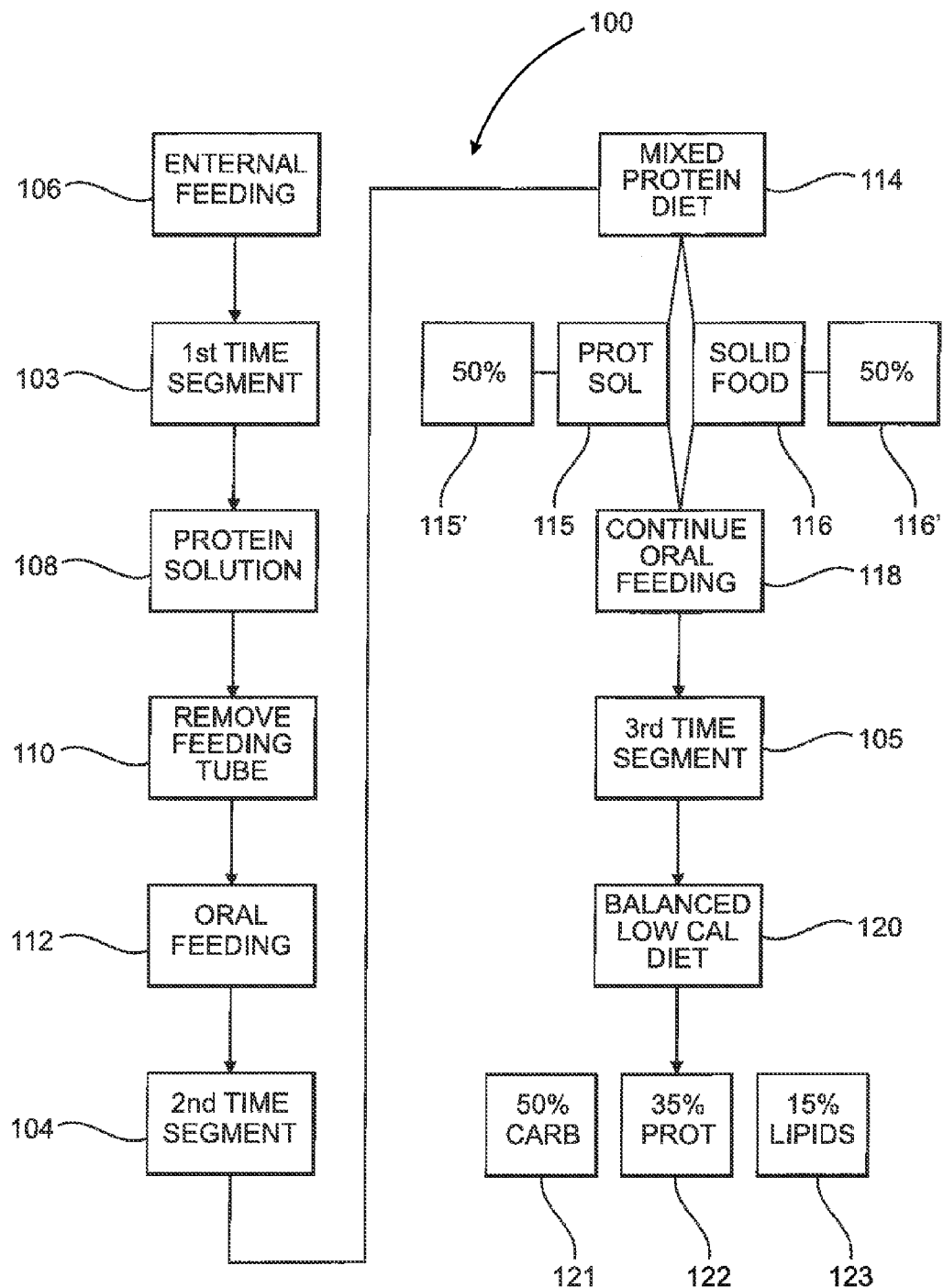
FIG. 2 is schematic representation in block diagram form of the weigh loss method of the present invention and the various procedures operatively associated therewith.

With primary reference to the schematic representation of FIGS. 1 and 2, and as generally set forth above the weight loss method of the present invention is generally indicated as 100 and comprises the administration of nutrients high in protein by a combination of enteral feeding and oral feeding over a predetermined time period generally indicated as 102. In a preferred embodiment of the weight loss method of the present invention the predetermined time period comprises 24 consecutive days. Moreover, the predetermined time period 102 may be considered a plurality of preferably three time segments 103 through 105, during which the enteral feeding occurs throughout the first time segment 103, and the oral feeding is conducted during the second and third time segments 104 and 105 as will be explained in greater detail hereinafter.

However, it is to be noted that the second and third time segments follow immediately after the conclusion of the first time segment during which the enteral feeding is performed. Similar, the third time segment 105 takes place immediately after the conclusion of the second time segment. In more specific terms, the first time segment, comprised of the enteral feeding, is conducted continuously over days 1 through 10 of the predetermined time period 102 of 24 days. Cooperatively, the second time segment 104 is conducted during days 11 through 17 of the predetermined time period 102 of 24 days. Thereafter the third time segment 105 is conducted during days 18 through 24 of the predetermined time period 102 of 24 days.

With primary reference to FIG. 2, the administering of nutrients by a combination of enteral feeding and oral feeding begins after the appropriate placement, by medical personnel, of a nasogastric intubation apparatus, as generally set forth above. Therefore, the enteral feeding 106 conducted throughout the first time segment 103 including a substantially continuous feeding on a 24-hour basis through the days 1 through 10. During such period, the nutrient intake comprises the high protein solution 108 calculated on the protein needs of the individual patient or individual being treated. Upon completion of the enteral feeding at the end of the tenth day of the first time segment 103, the nasogastric tube is removed from the individual and the nasogastric intubation equipment is no longer used as at 110.

Oral feeding 112 begins on the 11$^{th}$ day which defines the beginning of the second time segment of the 24 days defining the predetermined time period 102. Nutrients supplied during the second time segment by oral feeding, as at 114, includes a mixed protein diet of a drinkable protein solution 115 and solid food 116. As such, the protein received by the individual by the mixed protein diet 114 is derived generally from about 15%, as at 115' from the protein solution and generally from about 50% from the solid food 116 as at 116'. As set forth above the second time segment, which includes the first session of oral feeding is conducted throughout days 11 through 17.

Immediately thereafter the oral feeding continues as at 118 and extends throughout the third time segment 105 of days 18 through 24 of the 24 days defining the predetermined time period 102. During the third time segment 105 of the nutrients totally administered to the individual is in the form of a balanced, low-calorie diet 120. As such, 50% of the calories are derived from carbohydrates as at 121, approximately 35% are derived from proteins as at 122 and generally about 15% are derived from lipids as at 123.

Other factors associated with the weight loss method of the present invention including, but not limited to, possible side effects, benefits, and overall health characteristics should be realized. More specifically, the weight loss method of the present invention involves a diet comprising excessive acidity. As a result a patient may encounter typical gastric systems of gastritis (stomach acidity). For these reasons ant-acid drugs may be prescribed thereby alleviating any discomfort.

In addition to the above, during the enteral feeding procedure of the first time segment (days 1 through 10) the patient is restricted in nutrient intake and does not consume fibers of any kind. For this reason there may be a resulting period of constipation requiring the administration of laxative drugs.

Also the inadvertent removal or partial removal of the nasogastric feeding tube during the first time segment of enteral feeding may require the entire removal of the tube by medical personnel in situations where partial removal is relatively significant. In contrast the inadvertent displacement of the feeding tube within about 1 to 3 centimeters does not require intervention by medical personnel and the tube may be properly reoriented or repositioned by the individual under treatment.

Accordingly, the system and/or method of the present invention provides for effective weight loss while substantially eliminating any significant adverse side effects and demonstrates advantages associated with the lower blood pressure, diabetes, cholesterol, fatty acids, etc. Moreover, a stable, reduced weight is maintained after termination of the dieting protocol defined by the present invention.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for losing weight, the method being effective for the treatment of an obese individual, the method comprising:
    administering nutrients in the form of a protein solution to the individual by enteral feeding throughout a first time segment of a predetermined time period, wherein the protein solution is formulated to be devoid of sugar,
    maintaining a nutritional protocol for a second time segment and a third time segment of the predetermined time period wherein the second time segment and the third time segments are distinct from and immediately follow the first time segment in sequential order,
    wherein the nutritional protocol during the second time segment includes administering, by oral feeding, a mixed protein diet comprising a drinkable solution and solid food, wherein the nutritional protocol during the third time segment includes administering, by oral feeding, a balanced, low-calorie food regimen, determining the total grams of protein to be administered during each 24 hours of the first, second and third time segments to be equal to the weight of the individual multiplied by 1.2 for a female individual and 1.5 for a male individual, and administering the determined amount of protein during each 24 hours of the first, second and third time segments and wherein the balanced, low-calorie food regimen is defined as including calories being derived from about 50% from carbohydrates; 35% from protein and 15% from lipids.

2. A method as recited in claim 1 wherein the total amount of protein being orally administered in the mixed protein diet is about equally derived from the drinkable solution and the solid food.

3. A method as recited in claim 2 wherein the first time segment of the predetermined time period is about 10 days.

4. A method as recited in claim 3 wherein the second time segment is about 7 days.

5. A method as recited in claim 3 wherein the third time segment is about 7 days.

6. A method as recited in claim 1 wherein the first time segment of the predetermined time period is about 10 days.

7. A method as recited in claim 6 wherein the second time segment is about 7 days.

8. A method as recited in claim 1 wherein the third time segment is about 7 days.

9. A method as recited in claim 1 comprising administering the nutrients throughout the predetermined time period by a combination of enteral feeding and oral feeding and wherein the predetermined time period is about 24 consecutive days.

10. A method as recited in claim 9 comprising administering nutrients by enteral feeding from day one through day ten of the 24 consecutive days.

11. A method as recited in claim 10 comprising maintaining the oral feeding from day 11 throughout day 24 of the 24 consecutive days.

12. A method as recited in claim 11 comprising the oral feeding of the mixed protein diet from day 11 throughout day 17 of the 24 consecutive days.

13. A method as recited in claim 12 comprising the oral feeding of the balanced, low-calorie food regimen from day 18 throughout day 24 of the 24 consecutive days.

14. A method of losing weight, the method being effective for the treatment of an obese individual comprising, administering protein nutrients by a combination of enteral feeding and oral feeding over a predetermined time period, conducting the enteral feeding over a first time segment of the predetermined time period including the administration of nutrients in a protein solution, conducting the oral feeding throughout a second time segment of the predetermined time period including the administering of the nutrients comprising a mixed protein diet comprising a combination of a drinkable solution and solid food, continuing the oral feeding throughout a third time segment of the predetermined time period including the administering of nutrients comprising a balanced, low-calorie diet, wherein each of the time segments are distinct from one another, and wherein the administration of nutrients during the first, second and third time segments of the predetermined time period is performed in a consecutive, uninterrupted manner, determining the total grams of protein to be administered during each 24 hours of the first, second and third time segments to be equal to the weight of the individual multiplied by 1.2 for a female individual and 1.5 for a male individual, and administering the determined amount of protein during each 24 hours of the first, second and third time segments and wherein the balanced, low-calorie diet is defined as including calories being derived from about 50% from carbohydrates; 35% from protein and 15% from lipids.

15. A method as recited in claim 14 comprising restricting the individual's intake of nutrients to the protein solution, the drinkable solution, the, the solid foods, the balanced, low-calorie diet, and a daily intake of at least a predetermined quantity of liquids.

16. A method as recited in claim 14 wherein said predetermined time period is about 24 consecutive days.

17. A method as recited in claim 16 wherein the first time segment is about 10 days.

18. A method as recited in claim 17 wherein the second time segment is about 7 days.

19. A method as recited in claim 18 wherein the third time segment is about 7 days.

20. A method as recited in claim 19 comprising administering nutrients by enteral feeding from day 1 through day 10 of the 24 consecutive days; maintaining the oral feeding from day 11 through day 24 of the 24 consecutive days; including the oral feeding of the mixed protein diet from day 11 through day 17 of the 24 consecutive days, and including the oral feeding of the balanced, low-calorie diet from day 18 through day 24 of the 24 consecutive days.

21. A method as recited in claim 14 wherein the administration of nutrients during at least the first time segment is devoid of sugar.

22. A method as recited in claim 20 wherein the total amount of protein administered during the second time segment includes protein derived about 50% from the drinkable solution and about 50% from the solid food.

* * * * *